3,125,452
PROCESS FOR STABILIZING VEGETABLE JUICES
Federico Alejo Parodi, Montevideo, Uruguay, assignor to Stabil Internacional S.A., Montevideo, Uruguay, a corporation of Uruguay
No Drawing. Filed Nov. 25, 1959, Ser. No. 855,261
9 Claims. (Cl. 99—182)

This invention relates to a process for preserving and stabilizing vegetable juices. More particularly, this invention relates to a process for stabilizing vegetable juices by charging the juice into its final container, de-aerating the juice by boiling the juice in the container at a temperature below its boiling point at atmospheric pressure, sealing the container and sterilizing the juice in the container at a temperature below its boiling point at atmospheric pressure.

This application is a continuation-in-part of co-pending application Serial No. 712,685, filed February 3, 1958, now abandoned.

It has been proposed to preserve milk and milk products by charging the milk into its final container, de-aerating the milk by boiling it under reduced pressure, sealing the container while preventing the entrance of atmospheric air into the container and sterilizing the milk by heating it to a temperature above about 120° C.

In attempting to use this process for preserving vegetable juices, it was found that vegetable juices, particularly fruit juices and more particularly citrus fruit juices are deleteriously affected by the operating conditions used in the milk preserving process in that the preserved juices have a flavor significantly different from the flavor of the fresh juice.

In attempting to modify the milk process as applied to vegetable juice, it was first proposed, in order to avoid changing the flavor of these juices, to obtain a more complete de-aeration of the liquid prior to the sterilizing step by utilizing a much higher vacuum. However, the use of the higher vacuum produced no substantial improvement in the flavor of the final product.

It has been discovered that the flavor of vegetable juices, especially citrus fruit juices, is extremely sensitive to the temperatures used during the sterilization step. It has been discovered that when the temperature of the final sterilization step does not exceed the boiling point at normal atmospheric pressure of the liquid under treatment, the flavor of the final product compares very favorably with the flavor of the untreated natural juice. In fact, the flavor of the final product is virtually identical with that of the natural fruit juice.

The process of the present invention, therefore, comprises the steps of charging the juice into its final container, applying vacuum to said container to boil the contents thereof while maintaining the temperature of the contents lower than the boiling point of the contents at normal atmospheric pressure, the juice being de-aerated during this boiling operation, sealing the container while preventing air from entering therein, and heating the container to a temperature below the boiling point of the contents at normal atmospheric pressure for a period of time sufficient to sterilize the contents of the container.

During the sterilization step, the juice is heated at a temperature below about 100° C. and preferably at a temperature between about 83 and 95° C. The optimum range is between about 85 and 92° C. When sterilizing at 85° C., for example, seven to nine minutes are generally sufficient. When sterilizing at 90° six to seven and one-half minutes are generally sufficient.

The preferred temperature range during the ebullition step under reduced pressure is about 50–60° C. with the ideal temperature being about 55° C. Lower temperatures are inefficient because of the need for establishing greater vacuum and also because of the greater time requirement. Temperatures significantly in excess of 60° C., particularly in the case of citrus fruit juices, tend to undesirably alter the taste and flavor of the final product.

"Vegetable" as used herein is used in its broad scientific sense and refers to the plant kingdom. The process of the present invention, although preferably applied to citrus fruit juices such as orange, lemon, lime and/or grapefruit, is also applicable to a wide variety of vegetable juices including grape, apple, pear, sugar cane, tomato and carrot. The process is even applicable with great success to such exotic Brazilian fruits as caju and guarana.

*Example*

200 g. of freshly pressed orange juice were heated to a temperature of about 60° C., charged into a 220 cc. bottle adapted to be stoppered and sealed with a crown cap. The bottle represented the final container for the orange juice. The container with the juice therein was subjected to a vacuum, the liquid in the container boiling vigorously when the pressure in the bottle was reduced to 76 mm. of mercury. The contents were maintained boiling for a period of about four seconds and while maintaining the container under vacum conditions, the container was tightly stoppered with a crown cap, the entrance of atmospheric air being prevented prior and during the sealing.

The container was then placed in a water bath having a temperature of 85° C. for seven minutes during which time the container was continuously agitated. This heating sterilizes the juice. The container was then removed from the bath and allowed to cool slowly to room temperature.

This product was stored at room temperature for a period of six weeks. At the end of this period the contents were found to be in excellent condition without any signs of fermentation. The product had the same taste and flavor as the natural freshly pressed orange juice.

In the above example the orange juice may be replaced by the same weight of lemon, grapefruit, grape, apple, tomato or any of the other juices heretofore mentioned.

In each case the final product had excellent taste and flavor substantially the same as that of the fresh product although the product was stored over an extended period of time at room temperature.

It is evident that the process set forth in the above example may be applied to larger or smaller amounts of juice utilizing larger or smaller containers. It is also apparent that any sealing means for the container may be substituted for the crown cap provided an air-tight seal is obtained.

When the juice is boiled under reduced pressure, the juice is de-aerated. It has been found that boiling for a very short period of time such as for a few seconds is sufficient to substantially completely de-aerate the juice without affecting the taste of the juice.

If desired, the juice, before being charged into the final container, may be heated to a temperature below the boiling ponit at atmospheric pressure. Alternatively, the juice may be heated to the necessary temperature while in the ultimate container. Of course if the juice is already at an adequate temperature for ebullition it is not necessary to further heat it prior to or during the boiling step. It is understood that the temperature during the boiling step is maintained below the boiling point of the juice at atmospheric pressure and preferably maintained at a temperature of between about 50–60° C.

Freshly pressed vegetable juice, particularly citrus juice, has a delicate flavor which is easily destroyed by heating or other processing. However, when processed in accordance with the present invention the flavor of the raw juice is not changed and the final product has an excellent shelf life with no need of refrigerated storage or shipping.

It is obvious that the process of the present invention is not limited to freshly pressed whole juice but is equally applicable to solutions and concentrates of vegetable juices.

I claim:

1. A process for stabilizing a vegetable juice comprising the steps of charging the juice into its ultimate container, the temperature of the juice being below the boiling point of the juice at atmospheric pressure, deaerating the juice by applying vacuum to said container to boil the contents thereof while maintaining the temperature of the contents below said boiling point at atmospheric pressure, hermetically sealing said container while maintaining the contents under reduced pressure to prevent the entrance of air therein, and heating the container and its contents, while agitating the contents, at a temperature below said boiling point at atmospheric pressure for a period of time sufficient to sterilize the contents of said container.

2. A process as recited in claim 1 wherein the temperature during boiling does not exceed about 60° C.

3. A process as recited in claim 2 wherein the temperature is between about 50–60° C.

4. A process as recited in claim 1 wherein the sterilizing step is carried out at a temperature above about 83° C.

5. A process as recited in claim 4 wherein the sterilizing step is carried out at a temperature between about 83–95° C.

6. A process as recited in claim 1 wherein the juice is maintained at a temperature not exceeding about 60° C. during the boiling and wherein the temperature during the sterilizing step exceeds about 83° C.

7. A process as recited in claim 1 wherein the juice is maintained at a temperature between about 50–60° C. during the boiling and wherein the sterilizing step is carried out at a temperature between about 83–95° C.

8. A process as recited in claim 1, wherein the vegetable juice is fresh citrus fruit juice.

9. A process as recited in claim 7, wherein the vegetable juice is fresh citrus fruit juice.

References Cited in the file of this patent

UNITED STATES PATENTS

| | | |
|---|---|---|
| 732,083 | Jones | June 30, 1903 |
| 1,177,982 | Young | Apr. 4, 1916 |
| 2,021,665 | Malmquist | Nov. 19, 1935 |
| 2,434,388 | Brehm | Jan. 13, 1948 |
| 2,639,991 | Ball | May 26, 1953 |